United States Patent
Scholl

[11] Patent Number: 5,827,912
[45] Date of Patent: Oct. 27, 1998

[54] RUBBER COMPOUNDS CONTAINING OLIGOMERIC SILANES

[75] Inventor: Thomas Scholl, Bergisch Gladbach, Germany

[73] Assignee: Bayer AG, Germany

[21] Appl. No.: 657,095

[22] Filed: Jun. 3, 1996

[30] Foreign Application Priority Data

Jun. 16, 1995 [DE] Germany ............ 195 21 799.3
Dec. 28, 1995 [DE] Germany ............ 195 49 027.4

[51] Int. Cl.$^6$ .................................................. L08K 5/41
[52] U.S. Cl. .......................... 524/155; 524/262; 524/265
[58] Field of Search ................................ 524/265, 262, 524/155

[56] References Cited

U.S. PATENT DOCUMENTS

| | | | |
|---|---|---|---|
| 4,379,891 | 4/1983 | Haynes | 525/342 |
| 4,709,065 | 11/1987 | Yoshioka et al. | 556/428 |
| 5,110,969 | 5/1992 | Dittrich et al. | 556/427 |

FOREIGN PATENT DOCUMENTS

A-0670347  9/1996  European Pat. Off. .

*Primary Examiner*—Peter D. Mulcahy
*Attorney, Agent, or Firm*—Connolly & Hutz

[57] ABSTRACT

The rubber compounds according to the invention, containing a rubber, an oligomeric silane of formula (I), a filler and optionally other rubber auxiliary agents $$R^1R^2R^3Si-X^1-(-S_x-Y-)_m-(-S_x-X^2-SiR^1R^2R^3)_n \quad (I),$$

are used for the manufacture of molded rubber bodies, particularly tires, that have low rolling resistance and increased dynamic and thermal stability.

12 Claims, No Drawings

RUBBER COMPOUNDS CONTAINING OLIGOMERIC SILANES

The present invention relates to rubber compounds containing new oligomeric silanes (I) as well as the use of these rubber compounds for the manufacture of rubber vulcanizates. The rubber compounds according to the invention are suitable for the manufacture of moulded bodies, particularly for the manufacture of tires that have low rolling resistance as well as increased dynamic and thermal stability.

Although vulcanizates with improved hysteresis behaviour are known, they do however have several undesirable properties. Thus in EP 253 365 hysteresis improvers based on certain nitroamines are described. Due to the risk of transnitrosation there is however a desire for rubber auxiliary agents that are free from nitro and nitroso groups. Similar reservations also exist with regard to the nitrosoanilines of U.S. Pat. No. 4,690,965. Rubber vulcanizates having reduced hysteresis losses that contain specific diphenyl sulphides are furthermore known from EP 366 952. One disadvantage is that these additives are ineffective in natural rubber and, in addition, also cause it to decompose (see U.S. Pat. No. 2,470,948 in this regard). In DE-OS 2 141 159, 2 141 160 and 2 225 577 certain organosilanes are described that can also be used for the improvement of the rolling resistance of motor vehicle tires. The aim of the present invention was, however, in addition to the reduced rolling resistance, also to improve the thermal stability during the manufacture and use of the tires as well as their dynamic fatigue resistance. This is achieved with the oligomeric silanes of the present invention.

DE-OS 2 265 382 describes polysulphide derivatives for the cross-linking of rubber that lead to vulcanizates with increased thermal stability. EP 385 072 and 530 590 describe similar compounds. However, the mechanical properties of the vulcanizates suffer losses. This becomes clear from their reduced tensile strength and impaired abrasion behaviour. Besides, during the vulcanization the compounds of EP 385 072 and 530 590 release secondary amines that can form undesirable nitrosamines during vulcanization.

It has now been found that with the aid of the oligomeric silanes (I) according to the invention vulcanizates can be obtained with lower dynamic damping, improved thermal stability and improved dynamic stability, so that the possibility arises herefrom of manufacturing rubber articles in shorter times at higher temperatures without losses in quality or of using rubber parts at higher use temperatures for longer periods.

The present invention therefore provides rubber compounds containing a rubber, a filler, optionally other rubber auxiliary agents, and at least one silane of formula (I)

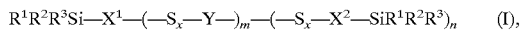

wherein $R^1$, $R^2$ and $R^3$ are the same or different and stand for $C_1$–$C_{18}$ alkyl or $C_1$–$C_{18}$ alkoxy radicals which can optionally be interrupted by oxygen, nitrogen or sulphur atoms, or represent $C_6$–$C_{12}$ aryl, $C_6$–$C_{12}$ aryloxy, $C_7$–$C_{18}$ alkylaryl or $C_7$–$C_{18}$ alkylaryloxy, with the proviso that at least one of the groups $R^1$ to $R^3$ is an alkoxy, aryl oxy or alkylaryloxy group;

$X^1$ and $X^2$ are the same or different and stand for linear, branched or cyclic, optionally unsaturated, $C_1$–$C_{12}$ alkylene groups, Y stands for linear, branched or cyclic, optionally unsaturated $C_1$–$C_{18}$ alkylene groups, that are optionally substituted by $C_6$–$C_{12}$ aryl, $C_1$–$C_8$ alkoxy or hydroxy groups and may optionally be interrupted by oxygen, sulphur or nitrogen atoms or aromatic $C_6$–$C_{12}$ groups, as well as for $C_6$–$C_{12}$ arylene groups or heteroarylene groups, m stands for a whole number from 1 to 20, n stands for a whole number from 1 to 6 and x represents a number from 1 to 6, wherein the silane (I) is used in amounts of 0.1 to 15 wt. %, based on the amount of the rubber used in each case.

Particularly preferred compounds according to the invention are e.g. those of formula (I) wherein $X^1$ and $X^2$ represent methylene, propylene, butylene, pentylene or hexylene groups and Y represents methylene, ethylene, propylene, butylene, hexylene, cyclohexylene, octylene, decylene, dodecylene, 2,2'-oxydiethylene, methylenebis(2, 2'-oxyethylene), ethylenebis(2,2'-oxyethylene), 2,2-thiodiethylene, N-methyl-N',N"-diethylene or α,α-p-xylidene groups or groups such as 1,2,3-propylidene, N,N', N"-triethylene or 1,3,5-s-triazinyl, and in which n represents whole numbers from 1 to 6, m whole numbers from 1 to 10 and x whole numbers from 1 to 6. The compounds according to the invention can exist both as single compounds with a defined molecular weight and as an oligomer mixture with a molecular weight distribution. For reasons of process technology it is in many cases simpler to manufacture and use an oligomeric or polymeric mixture. The compounds have a molecular weight between about 500 and 8000.

The silanes (1) according to the invention can be produced in various ways:

A: By reaction of mercapto-group-containing silanes and di- and/or polymeric mercaptans with sulphur dichloride or disulphur dichloride with the elimination of HCl. The reaction can be carried out in a manner known as such at temperatures of –30° to +80° C., optionally in solvents such as alcohols or aromatic hydrocarbons:

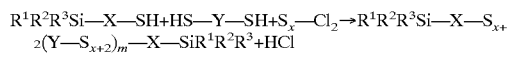

For the method of carrying out the reaction see e.g. Houben Weyl, Methoden der organischen Chemie, volume 9, pages 88 ff. (1955) and volume E 11 (1985), Thieme Verlag, Stuttgart.

B: The preparation of compounds (I) can be carried out particularly favourably if haloalkyl silyl ethers and polyhalides are reacted with metal polysulphides in the presence of alcoholic solvents at temperatures of –20° to +120° C.:

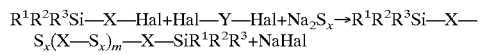

The metal polysulphides preferably used are those of the formula $Me_2S_x$, in which Me stands for lithium, sodium or potassium and x represents a number from 2 to 6.

Alcohols are preferably used as solvents, such as for example methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol, 1,6-hexanediol as well as mixtures of these alcohols with aromatic, aliphatic or cycloaliphatic hydrocarbons, such as toluene, cyclohexane, hexane, octane, or open-chain or cyclic ethers such as for example diethyl ether, dibutyl ether, tetrahydrofuran, 1,3-dioxolane and mixtures thereof with alcohols.

Particularly preferred compounds (I) correspond to the formulae

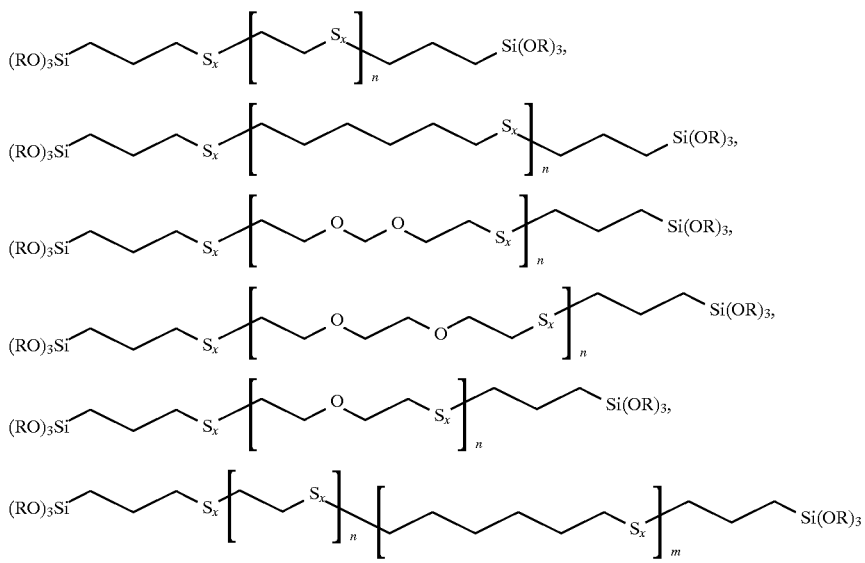

wherein
R=CH$_3$, C$_2$H$_5$,
x=1–6,
n=1–10,
m=1–10,
as well as

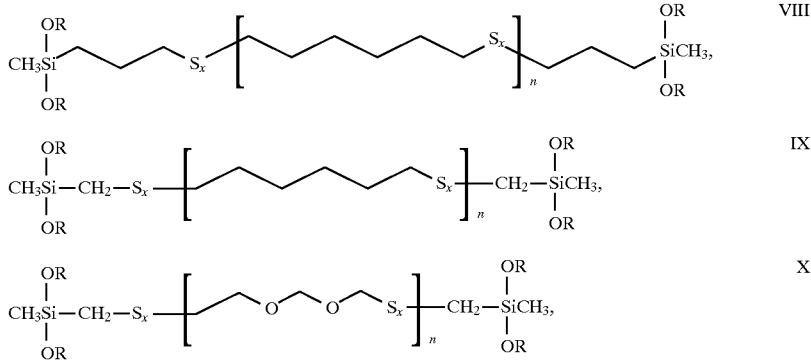

wherein
R=CH$_3$, C$_2$H$_5$,
x=1–6,
n=1–10.

The addition of the oligomeric silanes according to the invention of formula (I) as well as the addition of the fillers is preferably carried out at composition temperatures of 100° to 200° C. However, it can also be carried out later at lower temperatures (40° to 100° C.), e.g. together with other rubber auxiliary agents.

The oligomeric silanes (I) according to the invention can be added to the mixing process both in pure form and applied to an inert organic or inorganic support. Preferred support materials are silicas, natural or synthetic silicates, aluminium oxide or carbon blacks.

Suitable fillers for the rubber compounds according to the invention are:

Carbon blacks. The carbon blacks to be used in this case are manufactured by the flame soot, furnace or channel black processes and have BET surface areas of 20 to 200 m$^2$/g, such as for example SAF, ISAF, IISAF, HAF, FEF or GPF blacks.

Highly-dispersed silicas, manufactured e.g. by precipitation of solutions of silicates or flame hydrolysis of silicon halides, with specific surface areas of 5 to 1000, preferably 20 to 400, m$^2$/g (BET surface area) and with primary particle sizes of 10 to 400 nm. The silicas can also optionally be present as mixed oxides with other metal oxides, such as Al, Mg, Ca, Ba, Zn and Ti oxides.

Synthetic silicates, such as aluminium silicate, alkaline earth metal silicates such as magnesium silicate or calcium silicate, with BET surface areas of 20 to 400 m$^2$/g and primary particle diameters of 10 to 400 nm.

Natural silicates, such as kaolin and other naturally occurring silicas.

Glass fibres and glass fibre products (mats, rovings) or glass microspheres.

Carbon blacks with BET surface areas of 20 to 400 m$^2$/g or highly disperse silicas, manufactured by precipitation of solutions of silicates, with BET surface areas of 20 to 400 m$^2$/g in amounts of 5 to 150 parts by weight, in each case relative to 100 parts rubber, are preferably used.

The fillers mentioned can be used alone or as mixtures. In a particularly preferred embodiment of the process, 10–150 parts by weight of light-coloured fillers, optionally together with 0 to 100 parts by weight of carbon black, as well as 0.3 to 10 parts by weight of a compound of formula (I), in each case based on 100 parts by weight of rubber are used for the manufacture of the compounds.

In addition to natural rubber, synthetic rubbers also are suitable for the manufacture of the rubber compounds according to the invention. Preferred synthetic rubbers are described for example in W. Hofmann, Rubber Technology, Gentner Verlag, Stuttgart 1980. They include inter alia BR—Polybutadiene ABR—Butadiene/acrylic acid-$C_{1-4}$ alkyl ester copolymers IR—Polyisoprene SBR—Styrene/butadiene copolymers with styrene contents of 1 to 60, preferably 2 to 50, wt. %

XSBR—Styrene/butadiene copolymers and graft polymers with other unsaturated polar monomers such as for example acrylic acid, methacrylic acid, acrylonitrile, hydroxyethyl acrylate, hydroxyethyl methacrylate etc. having stirene contents of 2–50% by weight and contents of copolymerised polar monomers of 1–30% by weight IIR—Isobutylene/isoprene copolymers NBR—Butadiene/acrylonitrile copolymers with acrylonitrile contents of 5 to 60, preferably 10 to 50, wt. %

HNBR—Partially or fully hydrogenated NBR rubber

EPDM—Ethylene/propylene/diene copolymers as well as mixtures of these rubbers. Of particular interest for the manufacture of motor vehicle tires are anionically polymerized L-SBR rubbers with a glass-transition temperature above −50° C., which can optionally be modified with silyl ethers or other functional groups, of the kind described for example in EP-A 447 066 as well as blends thereof with diene rubbers.

The rubber vulcanizates according to the invention can contain other rubber auxiliary products, such as reaction accelerators, antiaging agents, heat stabilizers, light-protection agents, antiozonants, processing aids, plasticizers, tackifiers, blowing agents, dyes, pigments, waxes, extenders, surfactants, emulsifiers, sulphur-free silyl ethers, polysiloxanes, hydroxy-group-containing polydimethylsiloxanes, organic acids, retardants, metal oxides as well as activators such as triethanolamine, polyethylene glycol and hexanetriol, which are known to the rubber industry.

The rubber auxiliary agents are used in conventional amounts, which depend, inter alia, on the intended application. Conventional amounts are for example amounts of 0.1 to 50 wt. % based on rubber.

The oligomeric silanes can be used alone as cross-linking agents. If carbon black is the only filler or if such silanes of the formula I are used which are not mentioned in DE-A 4 406 947.2, the addition of other cross-linking agents is also recommended. Sulphur or peroxides can be used as other known cross-linking agents. In addition, the rubber compounds according to the invention can contain vulcanization accelerators. Examples of suitable vulcanization accelerators are mercaptobenzothiazoles and -sulphenamides, guanidines, thiurams, dithiocarbamates, thioureas and thiocarbonates. The vulcanization accelerators and (in the case of carbon black) sulphur or peroxides are used in amounts of 0.1 to 10 wt. %, preferably 0.1 to 5 wt. %, based on rubber.

The vulcanization of the rubber compounds according to the invention can be carried out at temperatures of 100° to 200° C., preferably 130° to 180° C., optionally under a pressure of 10 to 200 bar.

The rubbers can be mixed with the filler, optionally rubber auxiliary agents and the oligomeric silanes (I) according to the invention in conventional mixing units, such as cylinders, internal mixers and compounding extruders.

The rubber vulcanizates according to the invention are suitable for the manufacture of moulded bodies., e.g. for the manufacture of cable jackets, hoses, transmission belts, conveyor belts, roller coatings, tires, shoe soles, gaskets and damping elements.

EXAMPLES

Example 1

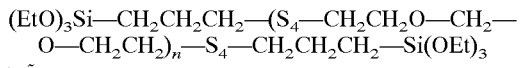

with ñ=2

117 g (1.5 mol) anhydrous $Na_2S$ were heated under reflux for 1 h with 144 g (4.5 mol) sulphur in a solvent mixture of 400 ml ethanol and 400 ml toluene. Then first 240.4 g (1 mol) 3-chloropropyltriethoxysilane were added and after heating for one hour under reflux 173.0 g (1 mol) bis(2-chloroethyl)formal. After stirring the mixture for a further 10 hours it was filtered and the solution evaporated in vacuo. 475 g of a brown oil with a viscosity of 200 mPa·s (25° C.) were obtained.

| | Elementary analysis: | | | | |
|---|---|---|---|---|---|
| | C | H | S | Si | |
| calc. | 33.7 | 6.2 | 38.5 | 5.8 | % |
| found | 33.4 | 6.3 | 39.0 | 5.3 | % |

Example 2

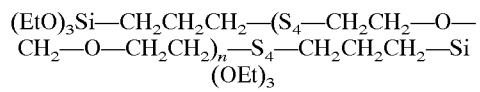

with ñ=3

The procedure of Example 1 was followed. 117 g (1.5 mol) anhydrous sodium sulphide were reacted with 144 g (4.5 mol) sulphur, 183.9 g (0.765 mol) 3-chloropropyltriethoxysilane and 197.5 g (1.142 mol) bis (2-chloroethyl)formal. 453 g of a brown oil with a viscosity of 500 mPa·s (25° C.) were obtained.

| | Elementary analysis: | | | | |
|---|---|---|---|---|---|
| | C | H | S | Si | |
| calc. | 32.2 | 5.9 | 41.7 | 4.6 | % |
| found | 32.4 | 5.9 | 41.2 | 4.4 | % |

Example 3

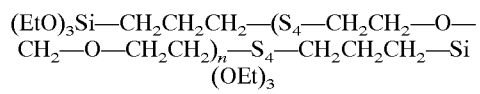

with ñ=4

The procedure of Example 1 was followed. 97.5 g (1.25 mol) anhydrous sodium sulphide were reacted with 120 g (3.75 mol) sulphur, 120 g (0.5 mol) 3-chloropropyltriethoxysilane and 173 g (1 mol) bis(2-chloroethyl)formal. 351 g of a brown oil with a viscosity of 880 mPa·s (25° C.) were obtained.

| Elementary analysis: | | | | | |
|---|---|---|---|---|---|
| | C | H | S | Si | |
| calc. | 31.3 | 5.6 | 43.9 | 3.8 | % |
| found | 31.3 | 5.6 | 41.6 | 4.0 | % |

Example 4

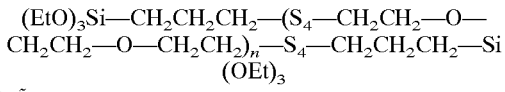

with ñ=2

The procedure of Example 1 was followed. 58.5 g (0.75 mol) anhydrous sodium sulphide were reacted in 500 ml ethanol with 72 g (2.25 mol) sulphur, 120.2 g (0.5 mol) 3-chloropropyltriethoxysilane and 93.5 g (0.5 mol) 1,2-bis(chloroethoxy)ethane. 223 g of a brown oil were obtained.

| Elementary analysis: | | | | | |
|---|---|---|---|---|---|
| | C | H | S | Si | |
| calc. | 35.1 | 6.4 | 37.4 | 5.5 | % |
| found | 35.3 | 6.5 | 36.5 | 6.0 | % |

Example 5

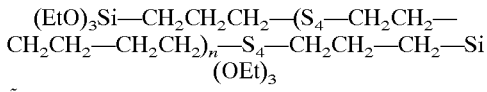

with ñ=3

The procedure of Example 1 was followed. 234 g (3 mol) anhydrous sodium sulphide were reacted in 1020 ml ethanol and 441 ml toluene with 288 g (9 mol) sulphur, 367.8 g (1.53 mol) 3-chloropropyltriethoxysilane and 355.9 g (2.295 mol) 1,6-dichlorohexane. 861 g of a brown oil were obtained.

| Elementary analysis: | | | | | |
|---|---|---|---|---|---|
| | C | H | S | Si | |
| calc. | 36.8 | 6.6 | 43.6 | 4.8 | % |
| found | 36.7 | 6.5 | 43.2 | 4.7 | % |

Example 6 (Preparation of rubber compounds and vulcanizates)

The following compounds were prepared within a period of 5 minutes at 140° C. in an internal mixer. Finally, sulphur and accelerators as well as the products of formula I were added at 50° C.

| | A* | B* | C | D | E | F |
|---|---|---|---|---|---|---|
| E-SBR Buna EM 1712 (HÜLS) | 103 | 103 | 103 | 103 | 103 | 103 |
| E-SBR Buna EM 1500 (HÜLS) | 25 | 25 | 25 | 25 | 25 | 25 |
| Carbon black N339 | 80 | 80 | 80 | 80 | 80 | 80 |
| Stearic acid | 2 | 2 | 2 | 2 | 2 | 2 |
| Zinc oxide | 5 | 5 | 5 | 5 | 5 | 5 |
| Antiozonant Vulcanox 4020 (Bayer) | 1 | 1 | 1 | 1 | 1 | 1 |
| Antioxidant Vulcanox HS (Bayer) | 1 | 1 | 1 | 1 | 1 | 1 |
| Sulphur | 1.5 | 1.2 | 1.2 | 1.2 | 0 | 0 |
| CBS, Vulkacite CZ (Bayer) | 1.2 | | | | | |
| bis(triethoxysilyl-propyl) tetrasulphide according to DE-OS 2 255 577 | 0 | 1 | 0 | 0 | 0 | 0 |
| Compound according to Ex. 2 | 0 | 0 | 1 | 0 | 2 | 0 |
| Compound according to Ex. 5 | 0 | 0 | 0 | 1 | 0 | 2 |
| Torque level after 45 min at 190° C. (in % of the maximum) according to DIN 53 529 | 84 | 90 | 96 | 96 | 100 | 100% |

*Comparative Example

The vulcanization behaviour of the rubber compounds was then examined in a Frank-Vulkameter DIN 53 529, Bayer System, at 190° C. In the table, the torque level after 45 minutes is quoted as a percentage of the maximum. High values therefore correspond to thermally stable vulcanizates, and low values to thermally labile vulcanizates: It is clear that with the compounds according to the invention obvious advantages are obtainable with regard to thermal stability.

Example 7

The compounds listed below were produced in an internal mixer within a period of 5 minutes at 140° C. After cooling the compounds were once again kneaded in the internal mixer for 3 minutes. Finally the following accelerators: N-cyclohexyl-mercaptobenzothiazole sulphenamide (Vulkacit CZ), diphenylguanidine (Vulkacit D) and tetrabenzylthiuram disulphide were added at 50° C. Vulcanization was carried out within a period of 40 minutes at 160° C.

| | G | H* |
|---|---|---|
| Components of the compounds: | | |
| L-SBR Buna VSL 1954 S 25 (Bayer) | 75 | 75 |
| BR Buna CB 11 (Bayer) | 25 | 25 |
| silica: Vulkasil S (Bayer) | 80 | 80 |
| carbon black: Corax N 339 | 6 | 6 |
| aromatic oil: Renopal 450 (Reinchemie) | 32.5 | 32.5 |
| zinc oxide | 2.5 | 2.5 |
| antiozonant: Vulkanox 4020 (Bayer) | 1 | 1 |
| antiozonant wax: Antilux 654 (Rheinchemie) | 1.5 | 1.5 |
| compound according to Example 2 | 6.5 | — |
| bis-(triethoxysilylpropyl)-tetrasulphide according to DE-OS 2,255,577 | — | 6.5 |
| N-cyclohexyl-mercaptobenzothiazole sulphenamide/Vulkacit CZ (Bayer) | 1.5 | 1.5 |
| tetrabenzylthiuram disulphide/Perkacit TBzTD (Akzo) | 0.2 | 0.2 |
| diphenylguanidine/Vulkacit D (Bayer) | 2 | 2 |
| Vulcanization kinetics: | | |
| Monsanto MDR 2000 160° C. | | |
| t-06 (minutes) | 32 | 6.6 |
| t-90 (minutes) | 18.7 | 16.2 |
| Propertes of the vulcanizate: | | |
| vulcanization at 160° C./40 minutes | | |
| modulus value at 100% elongation (MPa) | 2.4 | 1.8 |
| modulus value at 300% elongation (MPa) | 7.5 | 4.9 |
| tensile strength (MPa) | 18.1 | 14.4 |
| elongation at break (%) | 610 | 685 |

-continued

|  | G | H* |
|---|---|---|
| hardness at 23° C. (Shore A) | 68 | 62 |
| hardness at 70° C. (Shore A) | 62 | 51 |
| elasticity at 23° C. (%) | 25 | 24 |
| elasticity at 70° C. (%) | 41 | 38 |
| abrasion (DIN 53 516) | 98 | 105 |
| tan delta at 60° C. | 0.15 | 0.184 |

* = comparison example

The physical values measured show that the compound according to the invention is considerably more effective for the vulcanization of rubber than the comparison compound.

I claim:

1. A rubber compound for manufacture of tires comprising rubber, a filler and at least one silane of the formula (I):

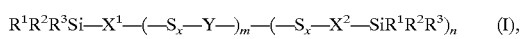

$$R^1R^2R^3Si\text{—}X^1\text{—}(\text{—}S_x\text{—}Y\text{—})_m\text{—}(\text{—}S_x\text{—}X^2\text{—}SiR^1R^2R^3)_n \quad (I),$$

wherein $R^1$, $R^2$ and $R^3$ are the same or different and represent $C_1$–$C_{18}$ alkyl or $C_1$–$C_{18}$ alkoxy radicals which may be interrupted by oxygen, nitrogen or sulphur atoms, $C_6$–$C_{12}$ aryl, $C_6$–$C_{12}$ aryloxy, $C_7$–$C_{18}$ alkylaryl, or $C_7$–$C_{18}$ alkylaryloxy, wherein at least one of the groups $R^1$ and $R^3$ is an alkoxy, aryloxy or alkylaryloxy group;

$X^1$ and $X^2$ are the same or different and represent linear, branched or cyclic $C_1$–$C_{12}$ alkylene groups;

Y represents linear, branched or cyclic $C_1$–$C_{18}$ alkylene groups, which may be substituted by $C_6$–$C_{12}$ aryl, $C_1$–$C_8$ alkoxy or hydroxy groups and may be interrupted by oxygen, sulphur or nitrogen atoms or aromatic $C_6$–$C_{12}$ groups, $C_6$–$C_{12}$ arylene groups, or heteroarylene groups;

m represents for a whole number from 1 to 20;

n represents for a whole number from 1 to 6; and x represents a number from 1 to 6;

wherein the silane (I) is present in amounts from 0.1 to 15 wt. %, based on the amount of rubber and wherein either:

i) the filler is carbon black, and the compound contains an additional cross-linking agent selected from the group consisting of sulfur and peroxides; or ii) the filler is silica or silica and carbon black and additional cross-linking agents are not present.

2. A vulcanizate comprising the rubber compound of claim 1.

3. A tire made from the vulcanizate of claim 2.

4. The rubber compound of claim 1, wherein in the formula (I), $X^1$ and $X^2$ are selected from the group consisting of methylene, propylene, butylene, pentylene and hexylene, Y is selected from the group consisting of methylene, ethylene, propylene, butylene, hexylene, cyclohexylene, octylene, decylene, dodecylene, 2,2'-oxydiethylene, methylenebis(2,2'-oxyethylene), ethylenebis(2,2'-oxyethylene), 2,2'-thiodiethylene, N-methyl-N',N''-diethylene, α,α-p-xylidene, 1,2,3-propylidene, N,N',N''-triethylene, and 1,3,5-s-triazinyl, and in which n represents a whole number from 1 to 6, m represents a whole number from 1 to 10, and x represents a whole number from 1 to 6.

5. The rubber compound of claim 1, wherein the compound (I) is a compound having a formula selected from the group consisting of:

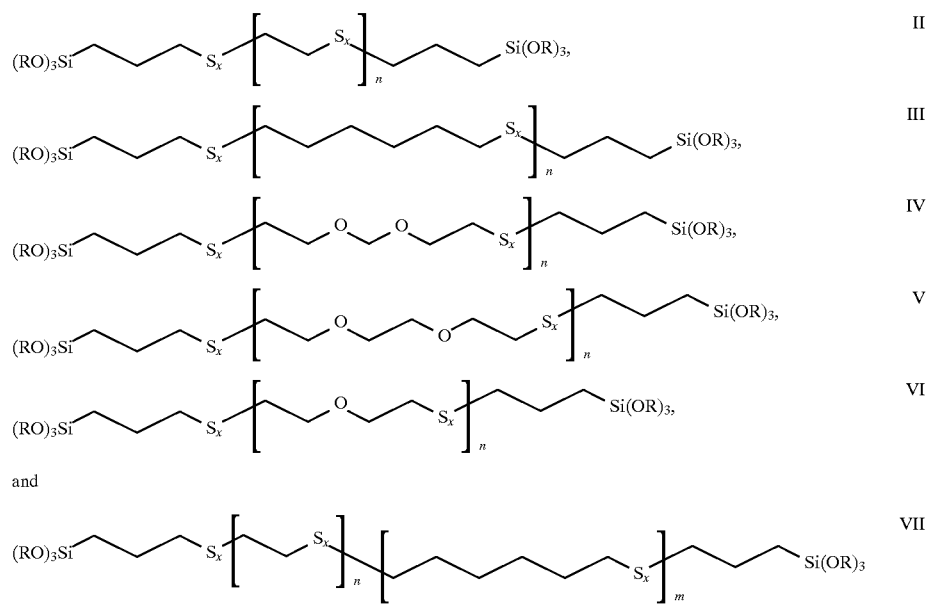

wherein $R=CH_3, C_2H_5,$ $x=1–6,$ $n=1–10,$ and $m=1–10.$

6. The rubber compound of claim 1, wherein the compound (I) is a compound having a formula selected from the group consisting of:

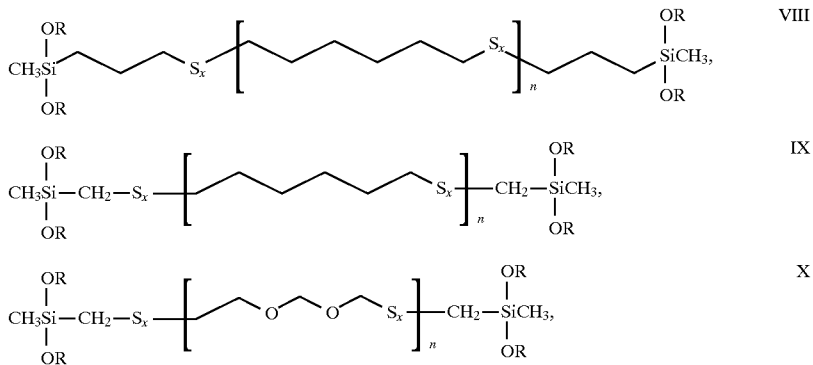
wherein
R=CH$_3$, C$_2$H$_5$,
x=1–6, and
n=1–10.
7. A vulcanizate comprising the rubber compound of claim 4.
8. A vulcanizate comprising the rubber compound of claim 5.
9. A vulcanizate comprising the rubber compound of claim 6.
10. A tire made from the vulcanizate of claim 7.
11. A tire made from the vulcanizate of claim 8.
12. A tire made from the vulcanizate of claim 9.
* * * * *